United States Patent [19]
Millar et al.

[11] Patent Number: 6,088,440
[45] Date of Patent: Jul. 11, 2000

[54] METHOD AND APPARATUS FOR OPERATING A TELEPHONE EXCHANGE HAVING SELECTABLE AUDIO SOURCES

[75] Inventors: Paul C Millar, Suffolk; Robert BP Carpenter, Ipswich, both of United Kingdom

[73] Assignee: British Telecommunications Public Limited Company, London, United Kingdom

[21] Appl. No.: 08/981,781

[22] PCT Filed: Jul. 17, 1996

[86] PCT No.: PCT/GB96/01709

§ 371 Date: Jan. 15, 1998

§ 102(e) Date: Jan. 15, 1998

[87] PCT Pub. No.: WO97/04574

PCT Pub. Date: Feb. 6, 1997

[30] Foreign Application Priority Data

Jul. 18, 1995 [GB] United Kingdom .................. 9514683

[51] Int. Cl.[7] .................. H04M 3/00; H04M 3/42; H04M 1/00

[52] U.S. Cl. .................. 379/251; 379/201; 379/252; 379/257; 379/372

[58] Field of Search ...................... 379/251, 252, 379/242, 372, 373, 374, 375, 201, 210, 211, 257

[56] References Cited

U.S. PATENT DOCUMENTS

| | | |
|---|---|---|
| 4,510,349 | 4/1985 | Segre-Amar . |
| 4,856,055 | 8/1989 | Schwartz ................................. 379/374 |
| 4,941,167 | 7/1990 | Cannalte et al. . |
| 5,200,994 | 4/1993 | Sasano et al. ......................... 379/374 |
| 5,220,599 | 6/1993 | Sasano et al. ......................... 379/374 |
| 5,329,578 | 7/1994 | Brennan et al. ....................... 379/211 |
| 5,598,461 | 1/1997 | Greenberg ............................... 379/373 |

FOREIGN PATENT DOCUMENTS

| | | |
|---|---|---|
| 420527 | 4/1991 | European Pat. Off. . |
| 4-319849 | 3/1993 | Japan . |
| 5-048728 | 6/1993 | Japan . |
| 2206265 | 12/1988 | United Kingdom . |
| WO-A-93-00763 | 1/1993 | WIPO . |

Primary Examiner—Harry S. Hong
Attorney, Agent, or Firm—Nixon & Vanderhye P.C.

[57] ABSTRACT

A telephone exchange transmits audible signals to a subscriber line to indicate exchange or network conditions. The audible signals to be transmitted to the subscriber line are selected from one or more available audible signal sources according to the contents of a store location for that subscriber line. Further store locations are provided for each subscriber line to enable selection of further audible signal sources dependent upon the condition. The subscriber may alter the contents of his or her store location by dialing a special code.

18 Claims, 7 Drawing Sheets

METHOD AND APPARATUS FOR OPERATING A TELEPHONE EXCHANGE HAVING SELECTABLE AUDIO SOURCES

BACKGROUND OF THE INVENTION

FIELD OF THE INVENTION

The present invention relates to telephone exchanges and more particularly to audible signals to be transmitted by the exchange to a subscriber line to indicate exchange or network conditions, e.g. that dialling is possible and to indicate an attempt to establish a desired connection.

SUMMARY OF THE INVENTION

U.S. Pat. No. 4,510,349 describes a system in which advertising or another type of message may be routed to the line of a subscriber making a call during the periods in which call progress signals such as dial tone would normally be present.

In U.S. Pat. No. 4,941,167, an information message may be routed to the line of a calling subscriber in the event that a call to a particular called subscriber line is unsuccessful, the information message having been selected or recorded by the particular called subscriber.

International patent application WO 93/00763 describes a telephone marketing system in which a pre-recorded announcement may be played to a calling subscriber in place of at least a portion of a call progress signal, ringing tone or engaged tone in particular.

UK patent application GB 2,206,265 describes a telephone toll service in which a calling subscriber may elect to hear advertisement messages while his call to a called subscriber line is being established, in return for a lower call tariff. Call processing may be suspended at the caller's local exchange until termination of the advertisement message(s).

According to one aspect of the present invention there is provided a telephone exchange comprising:

(a) store means having, for each of a plurality of subscriber lines connected to the exchange, a store location for containing a code word identifying one of a plurality of audio sources;

(b) control means responsive to an off-hook condition of a subscriber line to interrogate the corresponding store location and to route to the subscriber line the corresponding audio source to indicate that dialling is possible;

(c) means operable in response to assigned dialled signals from a subscriber line to change the code word in the corresponding store location so as to change the audio source to be selected for subsequent off-hook conditions of that subscriber without otherwise changing the response of the exchange to that subscriber.

According to another aspect of the invention there is provided a telephone exchange having:

(a) store means having, for each of a plurality of subscriber lines connected to the exchange, a store location for containing a code word identifying one of a plurality of audio sources;

(b) control means operable to recognise a condition relating to the routing of a call from a subscriber line connected to the exchange to another subscriber line to which a call is to be made and in response thereto to interrogate the store means corresponding to the calling subscriber line and to route to the calling subscriber line the audio source identified by the code word therein;

(c) means operable in response to assigned dialled signals from a subscriber line to change the code word in the corresponding store location so as to change the audio source to be selected for subsequent call attempts by that subscriber.

In a preferred arrangement the control means are operable following the receipt from the calling subscriber line of dialled digits corresponding to the subscriber line to which a call is to be made to store the dialled digits, the said condition being the storage of the dialled digits, and the control means are further operable, in response to the termination of signals from the audio source or the earlier presence or absence of a coded accept/reject signal from the calling subscriber line, to release the stored dialled digits for setting up of the call.

In a further aspect the invention provides a telephone exchange having control means operable following the receipt from a subscriber line of dialled digits for the setting up of a call to a called subscriber line:

(i) to route to the calling subscriber line an audio signal source to acknowledge receipt of the digits;

(ii) to send to the exchange of the called subscriber line a signal instructing it to refrain from applying ringing current to the called subscriber line;

(iii) to recognise a network condition corresponding to the successful routing of a call from the calling subscriber line to the called subscriber line and thereupon, in response to the termination of signals from the audio source or the earlier presence or absence of a coded accept/reject signal from the calling subscriber line, to send to the exchange of the called subscriber line a signal to release the application of ringing current to the called subscriber line.

BRIEF DESCRIPTION OF THE DRAWINGS

Some embodiments of the invention will now be described, by way of example, with reference to the accompanying drawings, in which.

FIG. 3—substitution of 'dial' tone with a subscriber-selectable audio source;

FIG. 4—basic substitution of 'ringing' tone with a subscriber-selectable audio source;

FIG. 5—playing a subscriber-selectable audio announcement while withholding dialled digits;

FIG. 6—playing a subscriber-selectable audio announcement while withholding dialled digits, with the further facility to select additional audio information linked to the initial audio announcement;

FIG. 7—playing a subscriber-selectable audio announcement while withholding ringing current to a called subscriber's line.

DETAILED DESCRIPTION OF EXEMPLARY EMBODIMENTS

Figure 1:
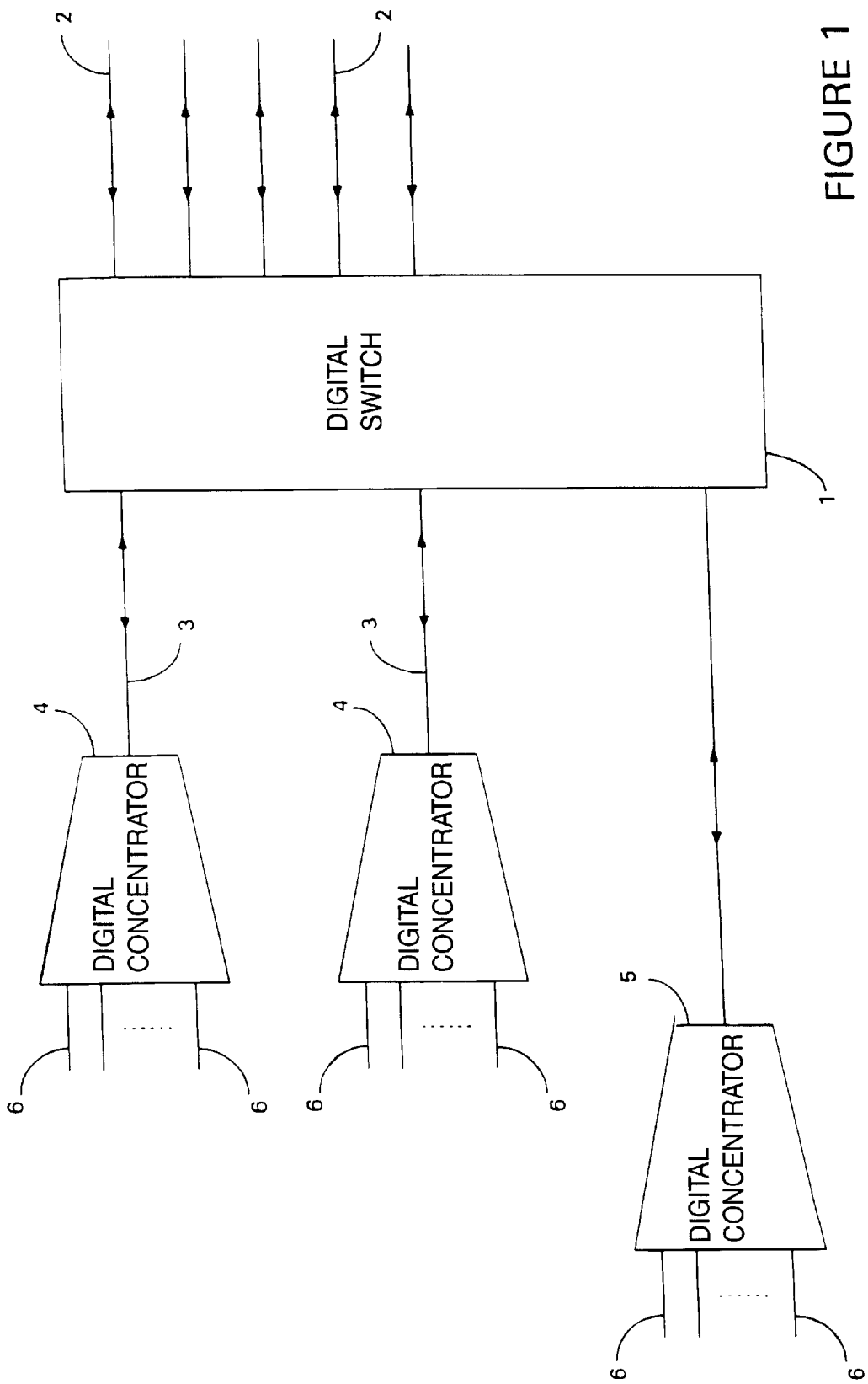
FIG. 1 shows a digital local exchange.

Referring to FIG. 1, a digital switch 1 is shown with connections 2 to other such exchanges and/or trunk exchanges of a telephone network, and connections 3 via digital concentrators 4 (and, if desired, remote concentrators 5) to analogue subscriber lines 6.

Figure 2:
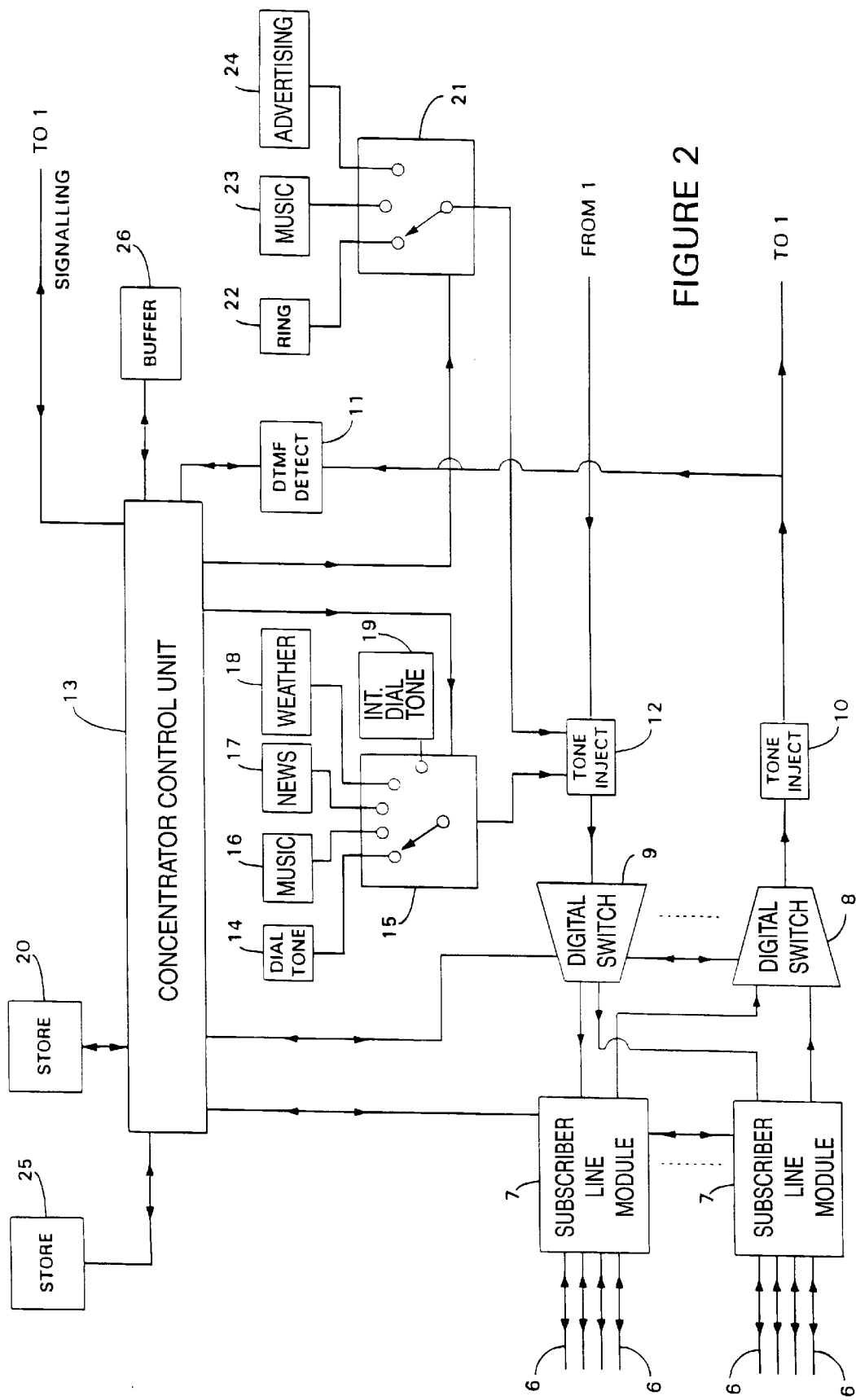
FIG. 2 shows the construction of a digital concentrator.

FIG. 2 shows the subscriber lines 6 connected to a number of subscriber line modules 7 within a digital concentrator 4, each line module 7 including ringing current injection, 2 wire to 4 wire conversion and analogue-to-digital and digital-to-analogue converters. Each line module 7 has a digital input and output connected to one of a number of digital switches 8, 9. Outgoing signals from a switch 8 pass via a tone injection unit 10 and thence to the digital switch 1. At this point also are connected receivers 11 for tone (DTMF) signalling. Similarly incoming signals pass from the switch 1 via a tone injection circuit 12. All these units 7–12 are connected to a concentrator control unit 13 in the form of a stored-program controlled processor.

When a subscriber goes "off-hook", this is recognized by the line module 7 which triggers processes in the control unit 13 to route connections via the switches 8,9 and to allocate one of the DTMF detectors 11 to recognize "dialling" by the subscriber. The fact that the subscriber is able to dial out is indicated to the subscriber by the control unit 13 enabling the passage of dial tone from a tone generator 14 via a switch 15 and tone injection unit 12.

The exchange, as thus far described, is conventional, as is the exchange's response to detection of normal dialling.

The exchange differs from conventional exchanges in the provision of substitute audio sources providing signals, for example:

Unit 16—a source of music
Unit 17—a source of recorded news
Unit 18—weather information A whole variety of audio sources is of course possible, such as local information lines, "what's on" broadcasting appeals, product information and so forth.

Other sources, for example unit 19 providing interrupted dial tone may be provided to indicate a particular state of the subscriber line—for example that call-forwarding is in effect.

It will be appreciated that all of these sources serve to provide a sound which the subscriber hears upon picking up his or her handset, i.e. the exchange's response to an off-hook condition.

In order that the subscriber may select which source is to be heard, the concentrator module 4 includes a store 20 containing a storage location for each subscriber line, so that a code number stored therein can be interrogated by the control unit 13 to identify the subscriber's current preference. It is envisaged that the subscriber may change his/her chosen preference at any time by keying a special code (e.g. *1, *2 etc.) which is received by the DTMF detector 11 and recognized by the control unit 13 which then writes the corresponding code number into the relevant location of the store 20. Next time the subscriber goes off hook, the new code number is present in the store 20 and the new preference is provided.

It is important to note that the changing of code numbers in the store 20 serves only to select the desired dialling tone or substitute, and does not otherwise affect the service provided by the exchange to the subscriber.

Figure 3:
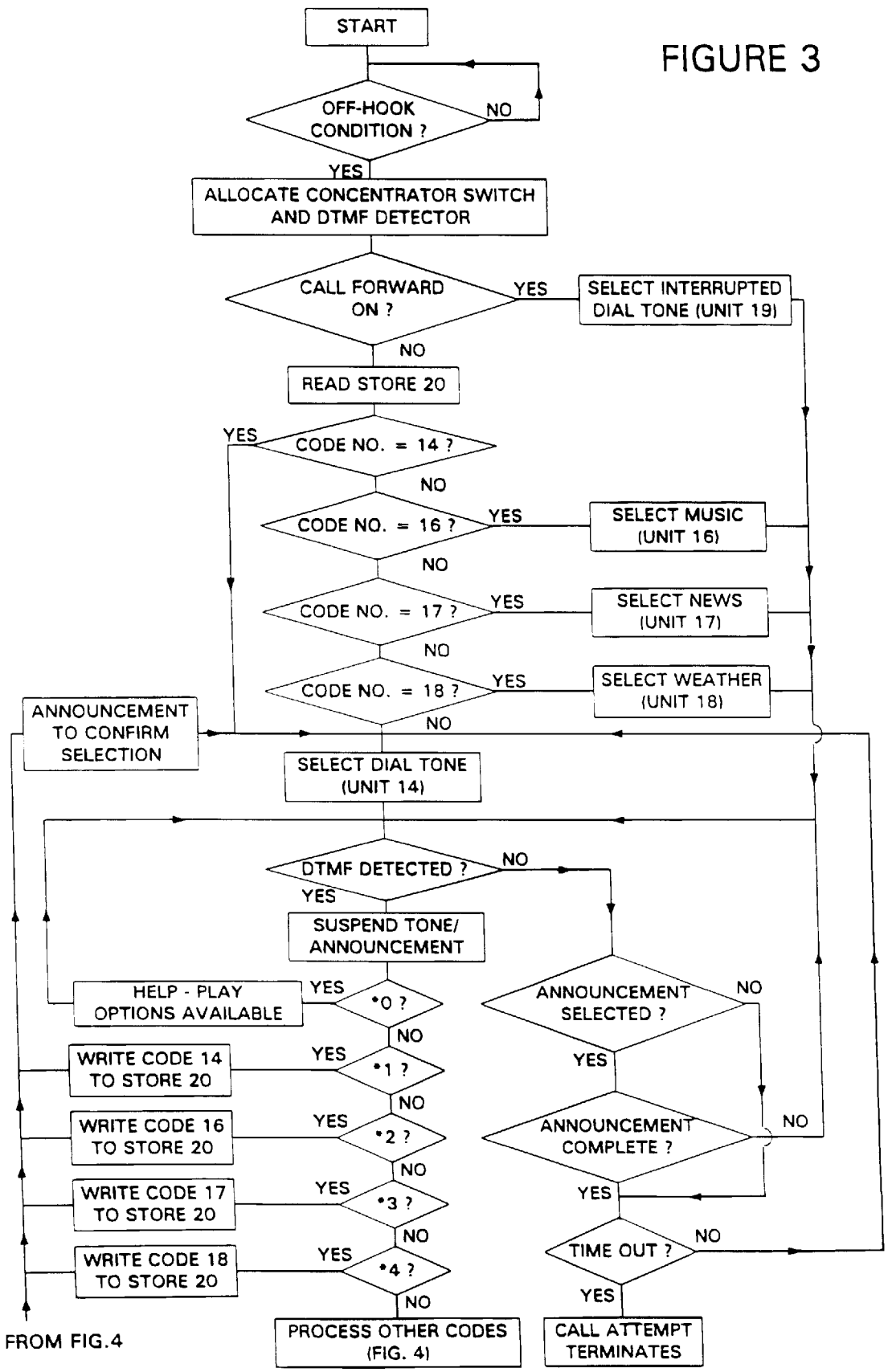
FIGS. 3 to 7 are flow charts showing the operation of the control unit 13 of FIG. 2 for each of the following embodiments.

With additional reference to FIG. 3, the operation of the control unit 13 will now be described in more detail for the case of a subscriber going off hook, in which it is assumed that the code numbers entered in the store 20 are the numbers 14 and 16 to 18 used in FIG. 2.

Following detection of the subscriber's off hook condition by line module 7 and allocation of a concentrator switch and DTMF equipment, a check is made to determine whether call forwarding is activated for that subscriber's line. If so, interrupted dial tone unit 19 is selected and the audio source routed to the subscriber via the switch 15 and the tone inject unit 12. If call forwarding is not activated, the control unit 13 reads the contents of the subscriber's storage location in the store 20 and selects the audio source unit identified therein. This may be the normal dial tone unit 14 or one of the substitute audio sources, units 16 to 18. The selected audio source is routed to the subscriber via the switch 15 and the tone inject unit 12.

The allocated DTMF equipment monitors the subscriber's line for any keyed number or code while the audio source plays. If a substitute audio source from units 16 to 18 finishes playing before detection of a DTMF signal on the subscriber's line, the dial tone unit 14 will be selected and dial tone played. While dial tone is selected, a time-out operates in the normal way until either a DTMF signal is detected on the subscriber's line or the time-out expires, in the latter case the call attempt will be terminated by the control unit 13.

Detection of DTMF indicates either that the subscriber has begun dialling the number of an intended called subscriber, or that a special code is being dialled to change the contents of a storage location. Detection of DTMF will immediately suspend the playing of the currently selected audio source.

If the subscriber dials the special code "*0", the control unit 13 will play a help announcement, listing the available audio sources and the corresponding codes to be entered. Entry of a valid code will update the subscriber's storage location in the store 20 to indicate the new preference and an announcement will be played to confirm the identity of the selected audio source. Dial tone from unit 14 will then be played until the subscriber either enters another special code or dials a telephone number or until the time-out expires.

In another embodiment of the invention, an alternative subscriber-selectable audio source may be played after dialling the number of the intended called subscriber rather than before, i.e. an alternative to ringing tone. In a conventional arrangement, dialled digits for setting up a telephone call are routed via the switch 1 and the network to the called subscriber's exchange (or, for a call to a subscriber on the same exchange, to the switch 1). When the called exchange has succeeded in establishing a connection and applied ringing current to the called subscribers line, it signals this fact back to the originating exchange where the control unit 13 causes injection of ringing tone via the injection unit 12.

In the simplest version of ringing tone substitution, an audio signal to indicate ringing is selected by the control unit 13 via a switch 21 from alternative sources 22 (conventional ringing tone) 23 (music) or 24 (advertising). The current selection is indicated by a code stored in a store 25 with a location for each subscriber analogous to the store 20 (in fact a single store might be used; or the functions of the stores 20 and 25 might be performed by allocated areas of a general purpose store in the control unit 13 itself).

Figure 4:
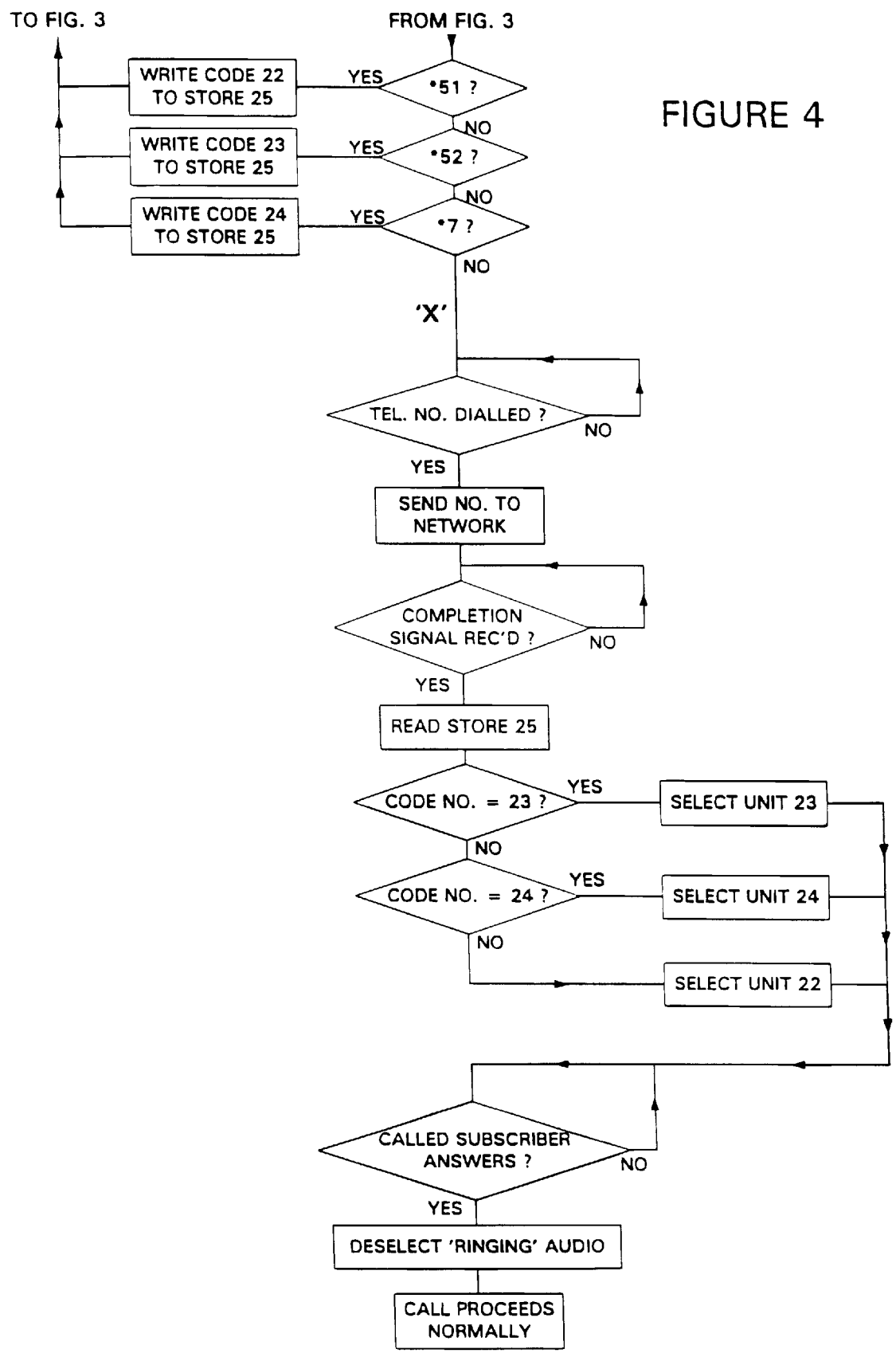

Operation of the control unit 13 in these circumstances is shown in the flow chart of FIG. 4. Note from FIG. 4 that the opportunity is provided for the subscriber, by dialling one of a further set of special codes, to alter the contents of his or her store location in the store 25 to indicate a preference for one of the audio sources 22 to 24, to be played following dialling of the telephone number of the intended called subscriber. The help announcement discussed with reference FIG. 3 may be further arranged to include, in the listing of the available audio sources, the option of selecting audio source units 22 to 24 for use after dialling of the called subscriber's number.

A disadvantage of the simple version of ringing tone substitution described above is that the calling subscriber hears the chosen sound for only so long as it takes for the called subscriber to answer. If preferred, therefore, completion of the call may be deliberately delayed to allow the caller to hear a desired message. This could be achieved either by buffering the dialled digits at the originating exchange (e.g. in a buffer 26), or by allowing continuation of the call set up process up to the point where the called exchange has verified that the called subscriber line is available to accept the call, whereupon the remote exchange awaits clearance before sending ringing current to the called line.

In order to avoid delaying urgent or emergency calls, it is highly desirable not only that the calling subscriber should be able to override this delay, but that the called subscriber should not be inhibited from making or receiving other calls while a first calling subscriber is listening to a substitute announcement before proceeding to call completion.

Figure 5:
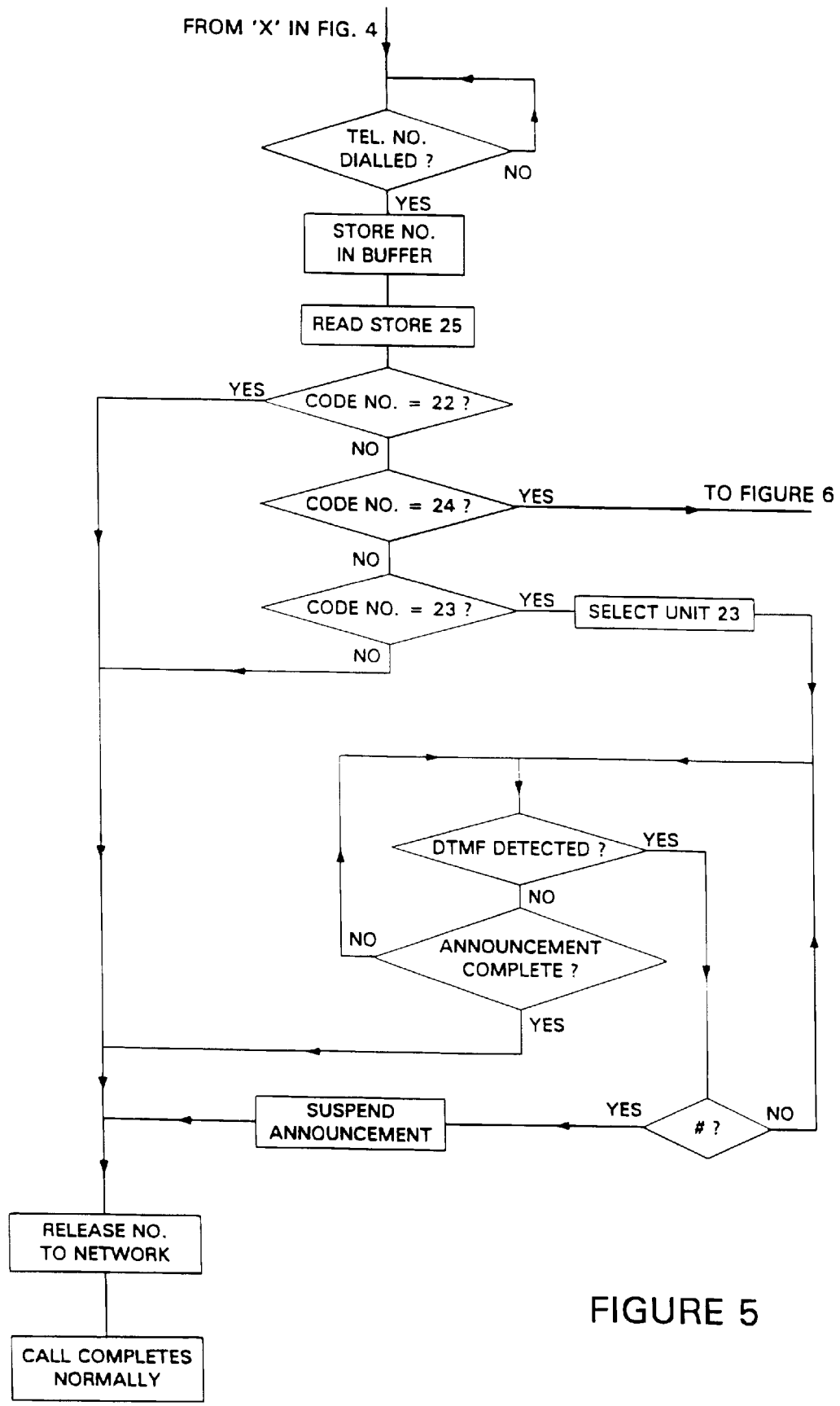

Thus, according to a yet another embodiment of the invention, for which the operation of the control unit 13 is shown in FIG. 5, call processing is suspended within the calling subscriber's originating exchange after dialling the telephone number of an intended called subscriber, the dialled digits being buffered in a buffer 26 while an audio source is played. The audio source is selected, according to the contents of a store location for that calling subscriber's line within the store 25, from the available audio source units 22 or 23 shown in FIG. 2 for this example. According to FIG. 5, after buffering the dialled digits, the control unit 13 reads the subscriber's store location in the store 25. If the conventional audio source unit 22 is indicated, then the buffered digits will be released immediately to the network for the call to proceed normally, conventional ringing tone being routed to the calling subscriber if the called subscriber's line is available to receive the call attempt. If substitute audio source unit 23 is indicated, the control unit 13 will route the audio announcement to the subscriber line via the switch 21 and tone inject unit 12. Meanwhile, the allocated DTMF detector will monitor the subscriber's line for any keyed number or code while the audio source plays. If audio source unit 23 finishes playing before detection of a DTMF signal on the subscriber's line, the buffered digits will be released to the network and the call attempt will proceed normally. However, if the subscriber dials a special code, e.g. "#", then the selected announcement will be immediately suspended and the dialled digits released to the network.

Figure 6:
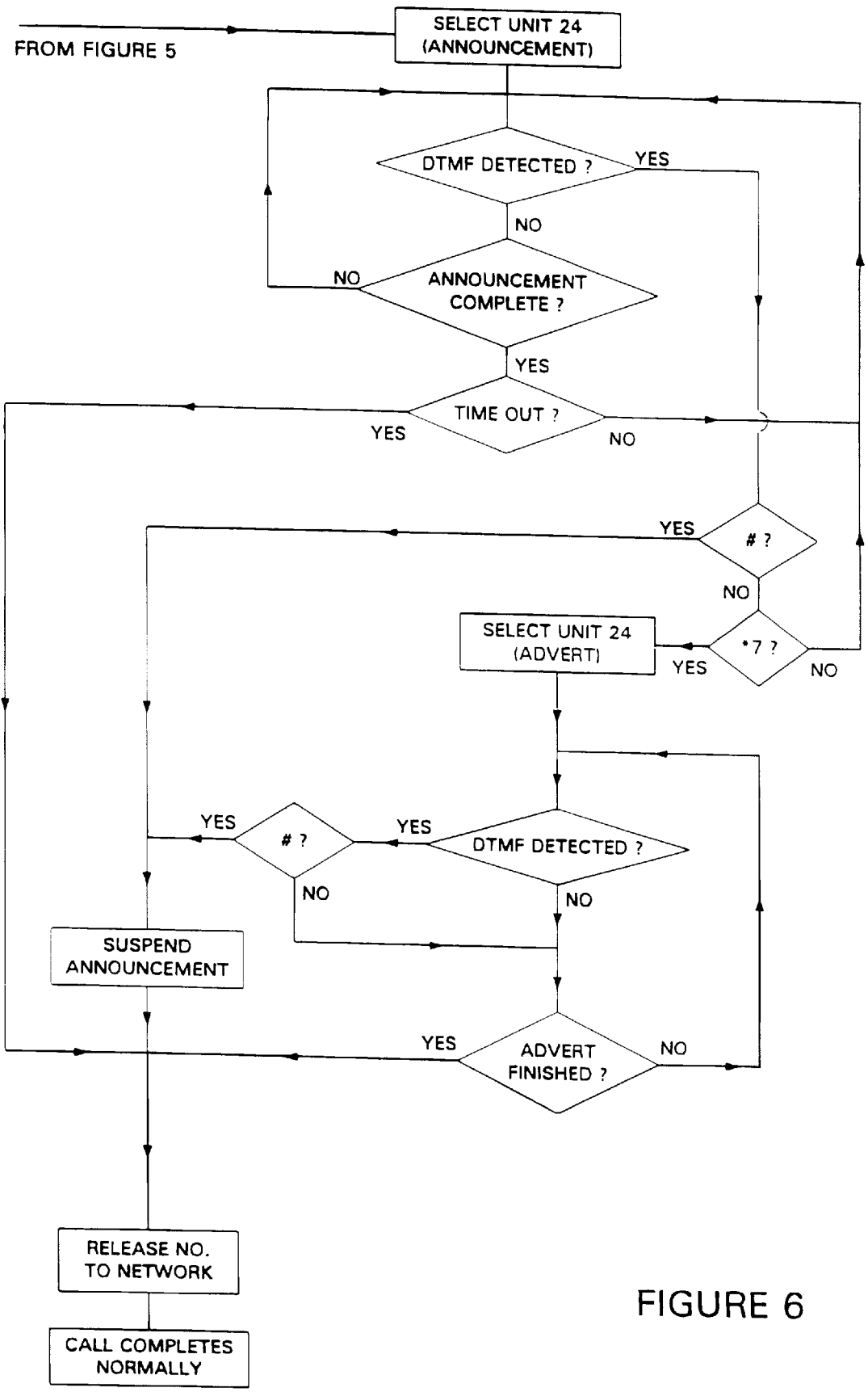

A variation on this embodiment is described with reference to FIG. 6, in which the control unit 13 is arranged to allow a calling subscriber to listen to a two part announcement, the second part being selected following the entry of a special code. In this example, the audio source unit 24 (advertising) of FIG. 2 provides a two part announcement. Whilst the first part of the announcement plays, the allocated DTMF detector monitors the subscriber's line for any keyed number or code. Dialing a "#" will immediately abort the announcement and release the dialled digits to the network for the call to proceed normally. Otherwise, the first part of the announcement prompts the subscriber to enter a code, "*7" for instance, if he or she wishes to hear further advertising. For example, "Bloggs Foodstores offer you 5 pence off the cost of this call. Press *7 to accept and hear details of this week's grocery offers". If the user keys "*7" then source 24 plays advertising. When the advertising has finished the buffered digits are released to the network and the call proceeds normally. If the user does nothing after the first part of the announcement, the buffered digits are released after a predetermined time-out period. Once again, if required, an announcement can be aborted at any stage by the subscriber entering a "#", although in this example, abortion of the second part of the announcement before completion may be recorded by the control unit 13 and the entitlement to the offered call discount withdrawn.

In yet another embodiment of the invention in which the dialled digits are not buffered, but rather are passed to the (remote) exchange for routing of the call, these digits will be accompanied by an instruction to that exchange to refrain (whilst otherwise processing the call normally) from applying ringing current to the called subscriber line. Once the called exchange has signalled to the calling exchange that the call is ready to proceed, the latter plays to the calling subscriber the audio source selected by the contents of the calling subscriber's store location in the store 25 and, on completion of the announcement or abortion by the calling subscriber, signals to the called exchange to release ringing, and applies normal ringing tone (or some other selected sound) to the calling line.

Figure 7:
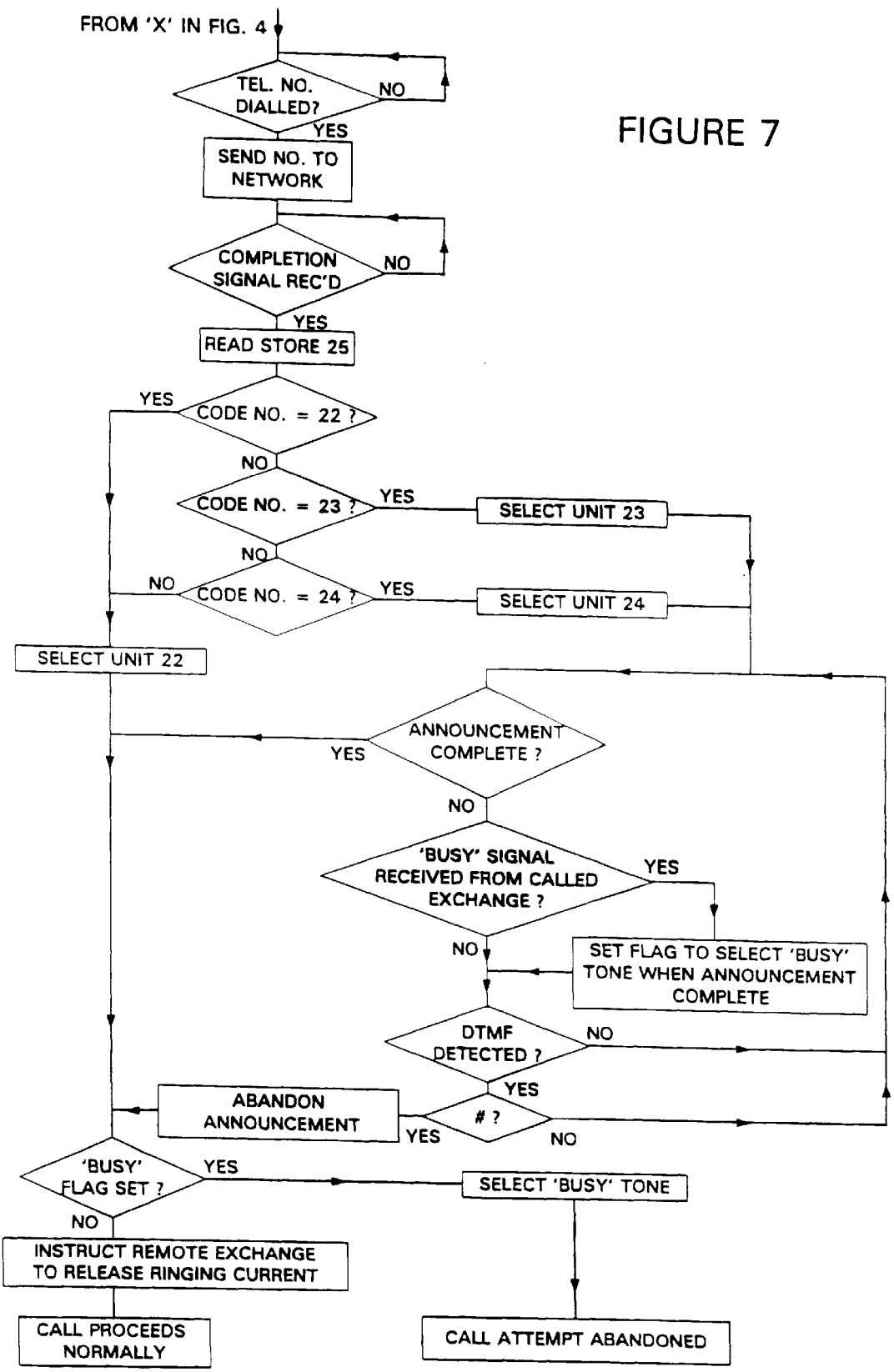

Referring to FIG. 7 it can be seen that, after forwarding the dialled digits to the called exchange and following receipt of a call completion signal indicating that the called subscriber's line is ready to receive a call, the control unit 13 reads the calling subscriber's store location in the store 25 and selects the audio source unit indicated therein. If the conventional ringing tone unit 22 is selected, the call will immediately proceed normally. Selection of one of the substitute audio source units 23 or 24 will result in the announcement being played to the calling subscriber in the same way as for the other embodiments. Once again, the calling subscriber may abort the announcement and proceed immediately with the call by entering the code "#" at any time while the announcement plays.

In order to avoid inhibiting the called subscriber from either making calls or receiving calls from other subscribers while the first calling subscriber listens to the selected announcement, the control unit 13 checks for a 'busy' signal being returned from the called exchange indicating that either the called subscriber's line has gone off-hook to make a call or that another incoming call is being received thereon. If such a 'busy' signal is received, a flag is set by the control unit 13 to record that the called subscriber's line is now 'busy'. When the announcement finishes, or if the calling subscriber aborts it after the setting of the 'busy' flag, busy tone will be routed to the called subscriber's line as normal. If the called subscriber's line remains ready to accept the call ('busy' flag not set), then upon completion of the announcement or abortion by the calling subscriber, the calling exchange signals to the called exchange to release ringing current and to proceed with the call attempt as normal.

The concept of substituting alternative audio sources for conventional tones may be extended to other tones, for example "busy" or "engaged" tones. The control unit 13 would be arranged to allow selection of the substitute audio source by the same method as for the embodiments described above, using a store location for each subscriber line within one of the existing stores 20 or 25, or within a further store dedicated to 'busy' tone replacement, for instance.

What is claimed is:
1. A telephone exchange comprising:
(a) store means having, for each of a plurality of subscriber lines connected to the exchange, a store location for containing a code word identifying one of a plurality of audio signal sources;

(b) control means responsive to an off-hook condition of a subscriber line to interrogate the corresponding store location and to route to the subscriber line a signal generated by the corresponding audio signal source to indicate that dialing is possible;

(c) means operable in response to assigned dialing signals from a subscriber line to change the code word in the corresponding store location so as to change the audio signal source to be selected for subsequent off-hook conditions of that subscriber without otherwise changing the response of the exchange to that subscriber.

2. A telephone exchange having:

(a) store means having, for each of a plurality of subscriber lines connected to the exchange, a store location for containing a code word identifying one of a plurality of audio signal sources;

(b) control means operable to recognize a condition relating to the routing of a call from a subscriber line connected to the exchange to another subscriber line to which a call is to be made and in response thereto to interrogate the store location corresponding to a calling subscriber line and to route to the calling subscriber line a signal generated by the audio signal source identified by the code word therein;

(c) means operable in response to assigned dialed signals from a subscriber line to change the code word in the corresponding store location so as to change the audio signal source to be selected for subsequent call attempts by that subscriber.

3. A telephone exchange as in claim 2 in which the condition is a condition corresponding to the successful routing of a call from a calling subscriber line connected to the exchange to a called subscriber line.

4. A telephone exchange as in claim 2 in which the condition is a condition corresponding to a failure to route a call from a calling subscriber line connected to the exchange to a called subscriber line.

5. A telephone exchange as in claim 2 in which the control means are operable, following receipt from a calling subscriber line of dialed digits corresponding to the subscriber line to which a call is to be made, to store the dialed digits, the said condition being the storage of the dialed digits, and in which the control means are further operable, in response to the termination of signals from the audio signal source or the earlier presence or absence of a coded accept/reject signal from the calling subscriber line, to release the stored dialed digits for setting up of the call.

6. A telephone exchange as in claim 3 in which:

(i) the control means are operable, following receipt from a calling subscriber line of dialed digits for the setting up of a call to a called subscriber line, to send to the exchange of the called subscriber line a signal instructing it to refrain from applying ringing current to the called subscriber line; and (ii) the control means arc further operable, in response to the termination of signals from the audio signal source or the earlier presence or absence of a coded accept/reject signal from the calling subscriber line, to send to the exchange of the called subscriber line a signal to release the application of ringing current to the called subscriber line.

7. A telephone exchange having control means operable following the receipt from a subscriber line of dialed digits for the setting up of a call to a called subscriber line:

(i) to route to a calling subscriber line a signal generated by an audio signal source to acknowledge receipt of the digits;

(ii) to send to the exchange of the called subscriber line a signal instructing it to refrain from applying ringing current to the called subscriber line;

(iii) to recognize a network condition corresponding to the successful routing of a call from the calling subscriber line to the called subscriber line and thereupon, in response to the termination of signals from the audio signal source or the earlier presence or absence of a coded accept/reject signal from the calling subscriber line, to send to the exchange of the called subscriber line a signal to release the application of ringing current to the called subscriber line.

8. A telephone exchange as in claim 7 including store means having, for each of a plurality of subscriber lines connected to the exchange, a store location for containing a code word identifying one of a plurality of audio signal sources, the control means being operable to interrogate the store location corresponding to the calling subscriber line and to route, in step (ii), to the calling subscriber line a signal generated by the audio signal source identified by the code word therein.

9. A telephone exchange as in claim 8 including means operable in response to assigned dialed signals from a subscriber line to change the code word in the corresponding store location so as to change the audio signal source to be selected for subsequent call attempts by that subscriber.

10. A method of operating a telephone exchange, said method comprising:

(a) storing, for each of a plurality of subscriber lines connected to the exchange, a code word identifying one of a plurality of audio signal sources;

(b) responsive to an off-hook condition of a subscriber line, interrogating the corresponding stored code and routing to the subscriber line a signal generated by the corresponding audio signal source to indicate that dialing is possible;

(c) in response to assigned dialed signals from a subscriber line, changing the stored code word so as to change the audio signal source to be selected for subsequent off-hook conditions of that subscriber without otherwise changing the response of the exchange to that subscriber.

11. A method of operating a telephone exchange, said method comprising:

(a) for each of a plurality of subscriber lines connected to the exchange, storing a code word identifying one of a plurality of audio signal sources;

(b) recognizing a condition relating to the routing of a call from a subscriber line connected to the exchange to another subscriber line to which a call is to be made and, in response thereto, interrogating the code word corresponding to a calling subscriber line and routing to the calling subscriber line a signal generated by the audio signal source identified by the code word;

(c) in response to assigned dialed signals from a subscriber line, changing the corresponding code word so as to change the audio signal source to be selected for subsequent call attempts by that subscriber.

12. A method of operating a telephone exchange as in claim 11 in which the condition is a condition corresponding to the successful routing of a call from a calling subscriber line connected to the exchange to a called subscriber line.

13. A method of operating a telephone exchange as in claim 11 in which the condition is a condition corresponding to a failure to route a call from a calling subscriber line connected to the exchange to a called subscriber line.

14. A method of operating a telephone exchange as in claim 11 in which, following receipt from a calling subscriber line of dialed digits corresponding to the subscriber line to which a call is to be made, storing the dialed digits, the said condition being the storage of the dailed digits, and in which in response to the termination of signals from the audio signal source or the earlier presence or absence of a coded accept/reject signal from the calling subscriber line, releasing the stored dialed digits for setting up of the call.

15. A method of operating a telephone exchange as in claim 12 in which:
    (i) following reciept from a calling subscriber line of dialed digits for the setting up of a call to a called subscriber line, sending to the exchange of the called subscriber line a signal instructing it to refrain from applying ringing current to the called subscriber line; and
    (ii) in response to the termination of signals from the audio signal source or the earlier presence or absence of a coded accept/reject signal from the calling subscriber line, sending to the exchange of the called subscriber line a signal to release the application of ringing current to the called subscriber line.

16. A method of operating a telephone exchange following the receipt from a subscriber line of dialed digits for the setting up of a call to a called subscriber line, said method comprising:
    (i) routing to a calling subscriber line a signal generated by an audio signal source to acknowledge receipt of the digits;
    (ii) sending to the exchange of the called subscriber line a signal instructing it to refrain from applying ringing current to the called subscriber line;
    (iii) recognizing a network condition corresponding to the successful routing of a call from the calling subscriber line to the called subscriber line and thereupon, in response to the termination of signals from the audio signal source or the earlier presence or absence of a coded accept/reject signal from the calling subscriber line, sending to the exchange of the called subscriber line a signal to release the application of ringing current to the called subscriber line.

17. A method of operating a telephone exchange as in claim 16 including storing for each of a plurality of subscriber lines connected to the exchange, a code word identifying one of a plurality of audio signal sources; interrogating the stored code word corresponding to the calling subscriber line and routing in step (ii), to the calling subscriber line a signal generated by the signal identified by the code word.

18. A method of operating a telephone exchange as in claim 17 including, in response to assigned dialed signals from a subscriber line, changing the corresponding code word so as to change the audio signal source to be selected for subsequent call attempts by that subscriber.

* * * * *